United States Patent Office 3,296,075
Patented Jan. 3, 1967

3,296,075
17α - ACYLOXY - 16 - METHYLENE - PREGN - 4-
ENE-3,20-DIONES, PHARMACEUTICAL PREPA-
RATIONS CONTAINING SAME, AND INTER-
MEDIATE THERETO
David Neville Kirk, Vladimir Petrow, Martin Stansfield, and David Morton Williamson, all of London, England, assignors to The British Drug Houses Limited, London, England, a British company
No Drawing. Filed Aug. 4, 1959, Ser. No. 831,481
Claims priority, application Great Britain, Aug. 11, 1958, 25,753/58
5 Claims. (Cl. 167—74)

This invention is for improvements in or relating to organic compounds and has particular reference to a new steroidal hydroxydione (originally believed to be 17α-hydroxy-16-methylpregn-4-ene-3,20-dione) and to acyl esters derived therefrom.

It is an object of the present invention to provide a new steroidal hydroxydione originally believed to be 17α-hydroxy-16-methylpregn-4-ene-3,20-dione but now believed to be 17α - hydroxy-16-methylenepregn-4-ene-3,20-dione having the formula

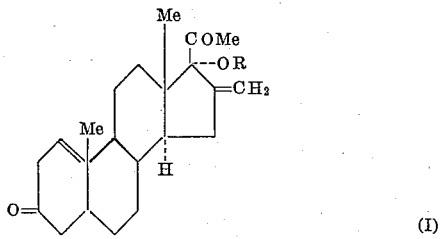

(where R is hydrogen) for reasons hereinunder described.

It is a further object of the present invention to provide novel acyl derivatives prepared by acrylation of the foregoing hydroxydione. These novel acyl derivatives, originally believed to be 17α-acyloxy-16-methylpregn-4-ene-3,20-diones are now believed to be acyl derivatives having the formula

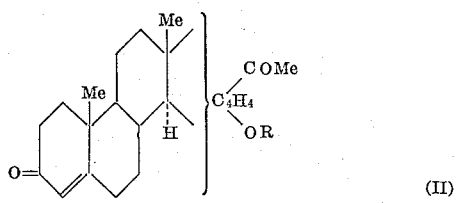

where R is an acyl group containing up to 10 carbon atoms.

17α - hydroxy-16-methylenepregn-4-ene-3,20-dione has progestational activity. In addition it is of value as an intermediate in the preparation of the novel acyl derivatives (II; where R is an acyl group containing up to 10 carbon atoms) which compounds have progestational properties. It may also be used as starting material for the preparation of the potent anti-inflammatory steroid 16-methyl-9α-fluoroprednisolone into which it may be converted by a variety of alternative routes. Thus, for example, it may be converted by hydrogenation into a 16-methyl derivative, which is transformed by oxidation with *Rhizopus nigricans* into the 11α-hydroxy derivative, which is transformed by the action of iodine/calcium oxide into the 21-iodo derivative, transformed by acetolysis into the 21-acetoxy derivative. The conversion of the 11α-hydroxy system of the last compound into the 9α-fluoro-11β-hydroxy system follows methods well established by prior art. The acetoxy derivative (II; where R=Ac) possess progestational properties when administered by the oral route. It exceeds the well-known progestational agent 17α - acetoxyprogesterone in its Na+ excreting and K+ retaining properties which renders it of value in the treatment of premenstrual tension, which condition is known to be associated with increased Na+ and water retention and K+ excretion. Other esters represented by Formula II (where R is an acyl group containing up to 10 carbon atoms (e.g. the caproyl derivative)) likewise have progesterone-like or progestational activity and are useful in the treatment of dysmenorrhoea, amenorrhea, endometriosis and threatened abortion in both clinical and veterinary practice. The novel compounds represented by Formula II (where R has the same meaning as above) can be prepared and administered in a wide variety of oral and subcutaneous dosage forms singly or in admixture with other coacting compounds. Thus they can be associated with a pharmaceutical carrier which can be a solid material or a liquid in which the compound is dissolved, dispersed or suspended. The solid compositions can take the form of tablets, powders, capsules, pills or preferably in unit dosage forms for simple administration or precise dosages. The liquid compositions can take the form of solutions, emulsions, suspensions, syrups or elixirs. The acetoxydione (II; R=Ac) is the preferred acyl ester and is preferably administered orally in the form of tablets.

The invention employs as starting material 16-methyl-pregna-4,16-diene-3,20-dione having the formula

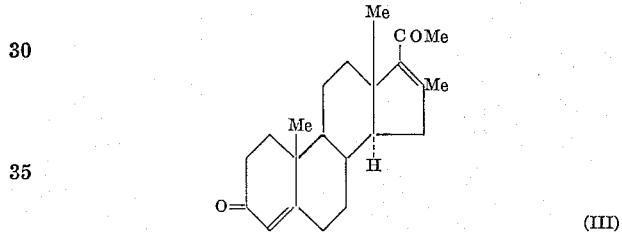

which material can be prepared by treating pregna-4,16-diene-3,20-dione with excess of diazomethane, followed by decomposition of the resulting pyrazoline.

The invention also provides the new compound 16-methyl-16α,17α-epoxypregn-4-ene-3,20-dione which is of value as an intermediate in the present invention.

According to the present invention there is provided a process for the preparation of 17α-hydroxy-16-methylenepregn-4-ene-3,20-dione which comprises reacting 16-methylpregna-4,16-diene-3,20-dione with alkaline hydrogen peroxide to give 16,17 epoxide having the formula

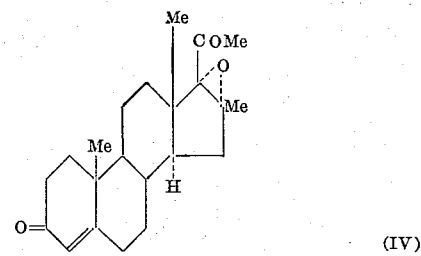

treating the epoxide with a hydrogen halide and submitting the resultant product to reaction with Raney nickel in an organic solvent.

The resultant compound, originally believed to be 17α-hydroxy-16-methylpregn-4-ene-3,20-dione, but now believed to be 17α-hydroxy-16-methylenepregn-4-ene-3,20-dione (I; R=H) may be acylated to give an acyloxydione (II; where R has the same meaning as above).

16-methylpregna-4,16-diene-3,20-dione is converted into the corresponding 16:17-epoxide by reaction with alkaline hydrogen peroxide in a water-miscible organic solvent, such for example as methanol or ethanol, at temperatures between 0° C. and 100° C. and preferably at the reflux temperature of the reaction mixture.

The epoxy-derivative so obtained is then treated with a hydrogen halide. This transformation is preferably performed with hydrogen bromide in an aliphatic acid, such as acetic acid, mixed with an inert organic solvent such as benzene at a temperature which is preferably in the region of 0° C. to 10° C. Alternatively aqueous hydrogen iodide in a water-miscible organic solvent, such, for example, as dioxan at temperatures in the region of 0° C. to 10° C. may be employed.

The product so obtained is treated with Raney nickel in an organic solvent such as ethanol or acetone at the ambient temperature.

Acylation of the resulting 17α-hydroxy-16-methylene-pregn-4-ene-3,20-dione to give an acyl derivative (II) is performed by methods well-known to those skilled in the art. Thus acetylation, for example, may be performed employing an acetylation mixture comprising glacial acetic acid, acetic anhydride and a catalytic quantity of toluene-p-sulphonic acid monohydrate at room temperature, or by using a mixture comprising acetic anhydride and a catalytic quantity of toulene-p-sulphonic acid monohydrate.

It is unequivocally established by prior art that 16α,17α-epoxypregnan-20-ones (V) react with hydrogen halides to form 17α-hydroxy-16β-halopregnan-20-ones (VI) which derivatives, on treatment with a catalytic reducing agent, yield the corresponding 17α-hydroxypregnan-20-ones (VII).

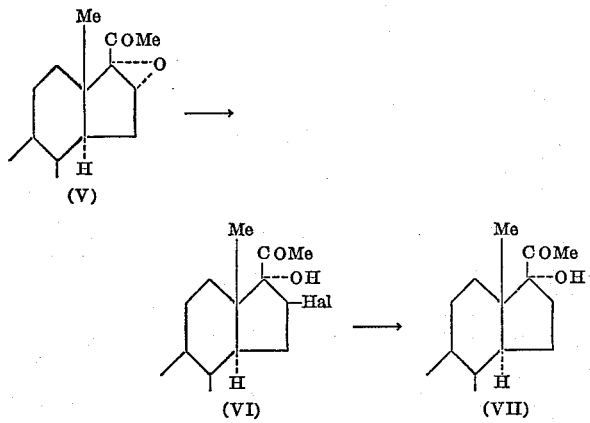

We therefore concluded that extension of this method to the 16-methyl derivative (IV) would analogously yield the corresponding 17α-hydroxy-16-methylpregn-4-ene-3,20-dione

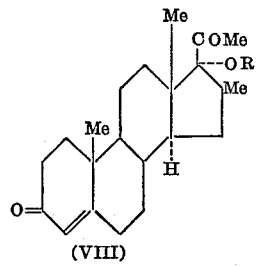

(where R is hydrogen) which on enforced acylation would yield the corresponding 17α-acyloxy-16-methyl derivative (VIII; R=Acyl). The ultraviolet and infra-red absorption spectra of our acylated product in fact proved to be entirely consistent with is formulation (VIII; R=acetyl), i.e.

$\lambda_{max.}^{EtOH}$ 239 mμ indicates 3-oxo-Δ⁴

$\nu_{max.}^{CHCl_3}$ 1738 cm.⁻¹ indicates acetyl $\nu_{max.}^{CHCl_3}$ 1715 cm.⁻¹ indicates 20-CO $\nu_{max.}^{CHCl_3}$ 1656 cm.⁻¹ indicates 3-CO $\nu_{max.}^{CHCl_3}$ 1615 cm.⁻¹ indicates Δ4

We therefore concluded that the reactions had proceeded according to the expectation of prior art and formulated our products accordingly.

Subsequently, however, we examined the reaction of the epoxide (IV) with sulphuric acid in dioxan, hoping thereby to obtain the corresponding 16-methyl-16,17-diol (IX).

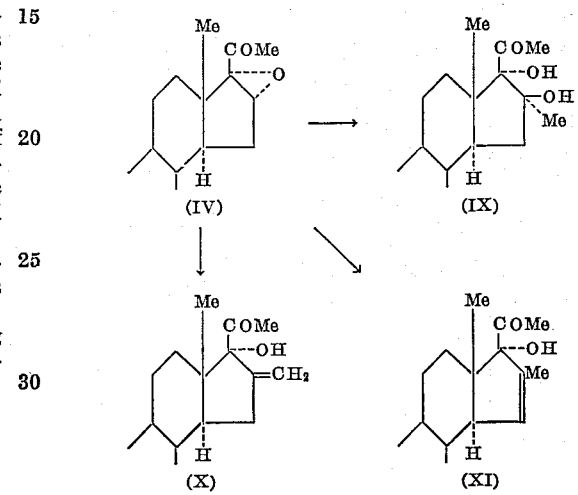

To our surprise the product proved to be identical with the new compound previously formuated as 17α-*hydroxy-*16-*methyl-pregn-4-ene-*3,20-*dione* (VIII; R—H) and obtained from the epoxide (IV) by successive treatment with a hydrogen halide and Raney nickel. This remarkable observation, which to our knowledge has no exact parallel in prior art, was clearly incompatible with the formulation of the new compound defined as 17α-hydroxy-16-methylpregn-4-ene-3,20-dione (VIII; R=H), but pointed to its alternative formulation as a 17α-hydroxy-16-methylenepregn-4-ene-3,20-dione (I; R=H), (cf. X) or as the isomer (XI). Formulation (X) is preferred on theoretical grounds. Its formulation as a conventional D-homo-structure formed from either (IX), (X) or (XI) by molecular rearrangement is regraded as unlikely as reduction of the carbonyl group attached to Ring D, followed by oxidation of the resulting glycol with periodate, leads to αβ-unsaturated ketone which presumably has partial structure (XIIa or b).

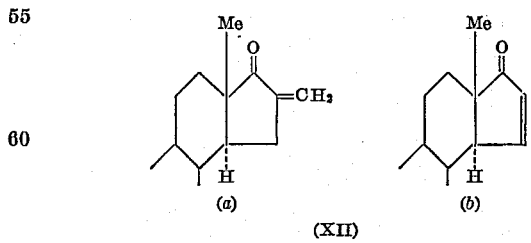

Enforced acetylation of the new compound now believed to be 17α-hydroxy-16-methylenepregn-4-ene-3,20-dione (I; (R=H) (cf. X) yields an acetyl derivative which is a potent orally-active progestational agent. The formulation of the acetyl derivative as 17α-acetoxy-16-methylpregn-4-ene-3,20-dione (VIII; R=Ac), must now clearly be revised in the light of the new formulation (I; R=H) for its immediate hydroxylated precursor. Unfortunately, the evidence available at the present time does not permit the conclusion to be drawn that acylation of (I; R=H) necessarily occurs to yield (I; R= acyl) without concomitant molecular rearrangement. The reason for this doubt is below.

Examination of the acetylated material by the method of nuclear magnetic resonance reveals, inter alia, absorption of 4.6 parts/million relative to tetramethylsilane as internal standard in the olefinic proton region which absorption is believed to indicate (i) the presence in the acylated material of 3 ordinary inactivated protons, preferably attached to cyclohexanic rings, and
(ii) the absence of methylene ($>C=CH_2$) which normally shows absorption at 5.2–5.4 parts/million relative to tetramethylsilane as internal standard.

In addition, the N.M.R. absorption spectrum appears to indicate the absence of a methyl group in the molecule (other than the angular methyl groups at $C_{10}$ and $C_{13}$). These observations are difficult to reconcile with structure (I; R=Ac) for the acetyl-derivative.

It is true that the science and art of nuclear magnetic resonance are still in their infancy, so that conclusions reached on the basis thereof must be accepted with caution. We nevertheless believe that the evidence presented by the N.M.R. determinations does not permit the facile conclusion that the acyl derivatives which form the ultimate products of this invention are represented as simple acyl derivatives (I; R=acyl) of the hydroxylated precursor (I; R=H). Formulation (II; R=acyl) is accordingly preferred for these valuable new compounds.

Following is a description by way of example of methods of carrying the invention into effect.

EXAMPLE 1

*16-methyl-16,17-epoxypregn-4-ene-3,20-dione*

16-methylpregna-4,16-diene-3,20-dione (2.5 g.) in methanol (700 ml.) was cooled to 15° C. and treated with sodium hydroxide solution (4 N; 18 ml.) and 30% hydrogen peroxide solution (36 ml.). The mixture was left for 24 hours at 0° C. and then poured into a large volume of water. The precipitate was filtered off, dried and crystallised from acetone/hexane to yield *16-methyl-16,17-epoxypregn-4-ene-3,20-dione*, M.P. 161 to 162° C., $[\alpha]_D^{24}$ +150° (c., 0.76 in chloroform), $$\lambda_{max.}^{EtOH} \text{ 239 m}\mu, \log \epsilon = 4.21$$

*17-hydroxy-16-methylenepregn-4-ene-3,20-dione*

(i) 16-methyl-16,17-epoxypregn-4-ene-3,20-dione (4 g.) was dissolved in glacial acetic acid (100 ml.) and benzene (100 ml.), cooled to 0° C. treated with hydrogen bromide in acetic acid (50% w./v.) (6 ml.), and stirred at 0° C. for 30 minutes. Water (500 ml.) was added and the mixture extracted with chloroform). The combined extracts were washed with water, sodium bicarbonate solution, water, dried and evaporated under reduced pressure, to give a crude product which was dissolved in acetone (200 ml.) and stirred at room temperature with Raney nickel (10 g.) in water (10 ml.) for 4 hours. The Raney nickel was filtered off, the acetone removed under reduced pressure, and the residue was crystallised from methanol to give *17-hydroxy-16-methylenepregn-4-ene-3,20-dione*, needles, M.P. 208 to 210° C., $[\alpha]_D^{24}$ −9° (c., 0.73 in chloroform $$\lambda_{max.}^{EtOH} \text{ 239.5 m}\mu, \log \epsilon = 4.24$$

$\nu_{max.}^{CHCl_3}$ 3596, 3488, 1707, 1684, 1660, 1605 cm.$^{-1}$ (ii) 16-methyl-16,17-epoxypregn-4-ene-3,20-dione (2.5 g.) in dioxan (125 ml.) was treated dropwise with hydrogen iodide (55% w./v. in water) (25 ml.) in the absence of light and stood at room temperature for 30 minutes. The mixture was then added dropwise with stirring to distilled water (350 ml.) and kept at 0° C. for 30 minutes, again in the absence of light. The precipitate was filtered off, washed with water and dried in a vacuum desiccator. The crude product so obtained was dissolved in ethanol (100 ml.) and shaken with Raney nickel (10 gm.) for 30 minutes at room temperature. The Raney nickel was filtered off, and the filtrate was evaporated to dryness under reduced pressure. The residue was crystallised from methanol to yield *17-hydroxy-16-methylenepregn-4-ene-3,20* needles, M.P. 208 to 210° C., identical with a specimen prepared as described above.

EXAMPLE 2

Acetyl derivative derived from *17-hydroxy-16-methylenepregn-4-ene-3,20-dione*. 17-hydroxy-16-methylenepregn-4-ene-3,20-dione (1 g.) was dissolved in glacial acetic acid (50 ml.) and acetic anhydride (25 ml.). p-Toluene sulphonic acid monohydrate (0.5 g.) was added and the mixture was left for 16 hours at room temperature. The reaction mixture was poured into a large volume of water, and the product isolated with ether. The solution was evaporated under reduced pressure and the residue crystallised from acetone/hexane to give the acetyl derivative derived from *17α-hydroxy-16-methylenepregn-4-ene-3,20-dione*, needles, M.P. 222 to 224° C., $[\alpha]_D^{24}$ −68° (c., 0.192 in chloroform), $\lambda_{max.}^{EtOH}$ 239 m$\mu$, log $\epsilon$=4.25, $\nu_{max.}^{CHCl_3}$ 1738, 1715, 1666, 1615 cm.$^{-1}$

EXAMPLE 3

*Caproyl derivative derived from 17α-hydroxy-16-methylenepregn-4-ene-3,20-dione*

17-hydroxy-16-methylenepregn-4-ene-3,20-dione (1 g.) in caproic anhydride (35 ml.) was treated with p-toluene sulphonic acid (0.5 g.) and the mixture stood at room temperature for 4 days. Pyridine (10 ml.) was then added and the mixture steam distilled for 1 hour. Isolation of the product with ether and removal of the solvent under reduced pressure gave the caproyl derivative derived from *17α-hydroxy-16-methylenepregn-4-ene-3,20-dione*, as a low melting solid characterised by $\lambda_{max.}^{EtOH}$ 239 m$\mu$, log $\epsilon$=4.23, $\nu_{max.}^{CHCl_3}$ 961, 1171, 1739 cm.$^{-1}$

EXAMPLE 4

*Formula for 1,000 tablets*

MATERIALS

|  | G. |
|---|---|
| Acetyl derivative derived from 17α-hydroxy-16-methylenepregn-4-ene-3,20-dione | 25 |
| Lactose, B.P. | 100 |

Magnesium stearate, a sufficient quantity.
Starch paste, 10%, a sufficient quantity.
Starch, B.P., sufficient to produce 150 g.

PROCESS

The steroid lactose and two-thirds of the starch were mixed together, moistened with a suitable quantity of starch paste and granulated through a No. 20 mesh screen.

The granule was dried at 50° C. again passed through a No. 20 mesh screen, and the magnesium stearate added, together with a sufficient starch to produce the required weight. The granule was compressed to produce tablets each weighing 150 mg.

We claim:
1. Acyl derivatives, wherein the acyl groups have up to 10 carbon atoms, derived from 17α-hydroxy-16-methylenepregn-4-ene-3,20-dione.
2. 16-methyl-16,17-epoxypregn-4-ene-3,20-dione.
3. 17α-acetoxy-16-methylenepregn-4-ene-3,20-dione.
4. 17α-caproyloxy-16-methylenepregn-4-ene-3,20-dione.
5. A pharmaceutical preparation comprising 17α-acetoxy-16-methylenepregn-4-ene-3,20-dione admixed with a pharmaceutical carrier.

(References on following page)

References Cited by the Examiner

UNITED STATES PATENTS

| | | | |
|---|---|---|---|
| 2,752,340 | 6/1956 | Ehrhart et al. | 260—239.55 |
| 2,874,172 | 2/1959 | Herzog et al. | 260—397.45 |
| 2,878,247 | 3/1959 | Miramontes et al. | 260—239.55 |

OTHER REFERENCES

Journal of Amer. Chem. Society (1952), article by Minlon et al., vol. 74, pp. 5394–96 relied on.

ELBERT L. ROBERTS, *Primary Examiner.*

LEWIS GOTTS, *Examiner.*